T. B. JEFFERY, DEC'D.
K. E., C. T. & H. W. JEFFERY, EXECUTORS.
VEHICLE WHEEL.
APPLICATION FILED OCT. 13, 1906.
1,056,278.
Patented Mar. 18, 1913.
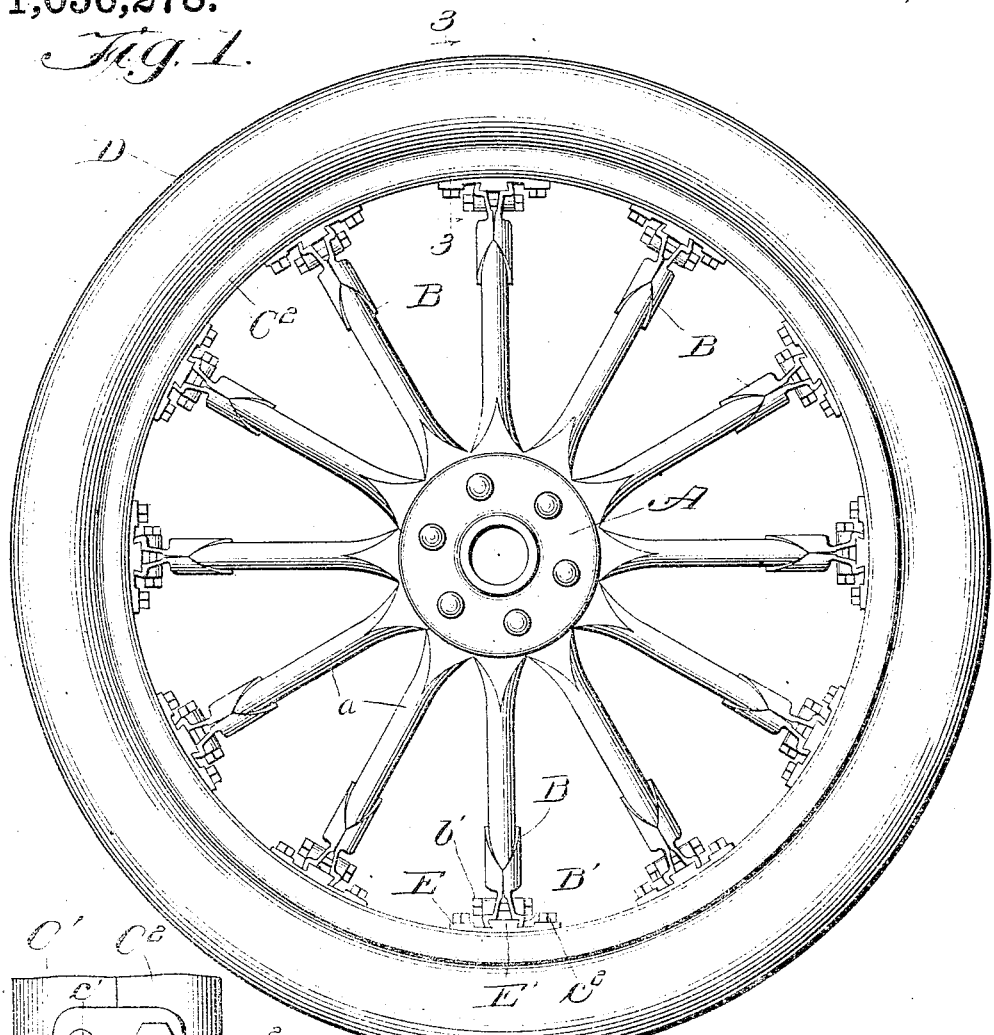
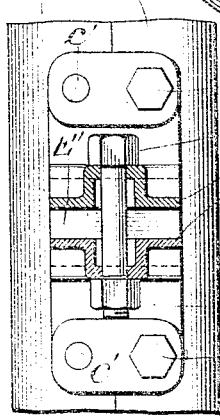
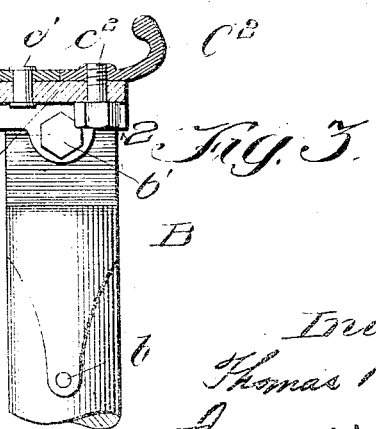

UNITED STATES PATENT OFFICE.

THOMAS B. JEFFERY, OF KENOSHA, WISCONSIN; KATE E. JEFFERY, CHARLES T. JEFFERY, AND HAROLD W. JEFFERY EXECUTORS OF SAID THOMAS B. JEFFERY, DECEASED.

VEHICLE-WHEEL.

1,056,278.

Specification of Letters Patent.

Patented Mar. 18, 1913.

Application filed October 13, 1906. Serial No. 338,713.

*To all whom it may concern:*

Be it known that I, THOMAS B. JEFFERY, a citizen of the United States, residing at Kenosha, county of Kenosha, State of Wisconsin, have invented a certain new and useful Improvement in Vehicle-Wheels, and declare the following to be a full, clear, and exact description of the same, such as will enable others skilled in the art to which it pertains to make and use the same, reference being had to the accompanying drawings, which form a part of this specification.

My invention relates in general to vehicle wheels and more particularly to a detachable pneumatic-tire rim.

In the use of pneumatic tires inconvenience and labor are occasioned by punctures, as it is then necessary to remove the tire from the rim and secure thereon a new tire, or when a double tube tire is used it is necessary to detach the outer casing from the rim and to remove and repair the punctured one, after which the tire must be inflated. Considerable waste time and trouble are consequently occasioned by the puncture of any form of pneumatic tire owing to the necessity of removing the tire from the rim.

The primary object of my invention is to provide a vehicle wheel around which a fully inflated pneumatic tire may be quickly and easily secured, thereby avoiding the necessity of repairing a punctured tire on the road and of inflating the repaired tire, or a new one substituted for the punctured tire.

A further object of my invention is to provide means for detachably securing a pneumatic tire rim directly to the spokes of a wheel, thereby permitting a flat tire to be readily replaced by a fully inflated tire.

A further object of my invention is to provide a two-part pneumatic tire rim which may either be removed in its entirety from the vehicle wheel, the spokes of which it surrounds, or one part may be removed while the other part remains secured around the spokes.

A still further object of my invention is to provide means for detachably securing a pneumatic tire to a vehicle wheel which will be simple in construction, inexpensive in manufacture and efficient in use.

The embodiment of my invention herein disclosed may be generally described as comprising a two-part metallic tire-rim located concentrically around the ends of the spokes of a vehicle wheel, a plate located in alinement with and detachably secured to each of the wheel spokes, to which one part of the rim is permanently and the other part detachably secured, two-part spoke heads secured to the ends of the spokes, the parts of each head adapted to removably engage a lug on the corresponding plate, and means for clamping the parts of each head to the interposed lug.

My invention will be more fully described hereinafter with reference to the accompanying drawing in which the same is illustrated as embodied in a convenient and practical form and in which—

Figure 1 is a side elevational view; Fig. 2 a detail sectional view on line 2—2 Fig. 3; and Fig. 3 a sectional view on line 3—3 Fig. 1.

The same referance characters are used to designate the same parts in the several figures of the drawing.

Reference character A indicates the hub of a vehicle wheel around which radiate spokes $a$. A two-part spoke head B is secured at the end of each of the spokes $a$ by any suitable means, such for instance as a bolt or rivet $b$ extending through alined holes in the two parts of the spoke-head and interposed spoke. The ends of the two parts of each spoke head B are provided with parallel flanges B′ between which is formed a dove-tail channel.

C′ and $C^2$ indicate the two parts composing a pneumatic tire rim of any desired type, a rim of the clencher type being shown for convenience.

D indicates a pneumatic tire surrounding and detachably supported in any suitable manner upon the rim.

Secured to the inner surface of the rim are plates E alining with the spokes $a$ of the wheel. To each of the plates E the part C′ of the rim is permanently secured by suitable fastening devices, such for instance, as rivets $c'$. The other part $C^2$ of the rim is detachably secured to each of the plates E by suitable fastening devices as for instance screws $c^2$. Each of the plates E is provided with a dove-tail lug E′ which is adapted to extend within the dovetail channel formed between the flanges B′ on the ends of the two parts of the corresponding spoke head.

In order that the two parts of each spoke-head may be clamped tightly against the interposed lug E' a bolt b' extends through registering holes in the two parts of the corresponding spoke head.

The manner of using and operation of my invention are as follows: When it is desired to remove the tire from the wheel, as for instance when it has been punctured, the nuts on the several bolts b' are slightly unscrewed so as to release the flanges on the ends of the two parts of the spoke heads from engagement with the interposed lugs E' on the several plates E. The rim may then be easily removed from around the ends of the spokes by a lateral movement. Another rim having a previously inflated pneumatic tire around the same may then be secured to the ends of the spokes of the wheel by moving the same laterally so that the several lugs E' will pass within the dove-tail channels formed between the flanges on the two parts of the several spoke heads. When the rim has been located in proper position around the ends of the spokes the nuts on the several bolts b' are tightened so as to clamp the flanges on the two parts of the spoke heads against the interposed dove-tail lugs. When it is desired to remove a tire from the rim without removing the rim from the wheel, the detachable part $C^2$ of the rim may be disengaged from the several plates E by removing the screws $c^2$. The tire may then be readily disengaged from the rim and a new tire placed around the portion C' of the rim and subsequently the detachable portion $C^2$ of the rim again located in position around the plates E and screwed to them by replacing the screws $c^2$.

By means of my invention it is possible for a vehicle such as an automobile to carry one or more extra rims with fully inflated tires secured around the same, and when a tire is punctured to readily remove its supporting rim from about the wheel and replace the same with one of the extra rims carrying an inflated tire. In this manner it is unnecessary to repair a punctured tire on the road or to detach the same from its rim and substitute a new tire around the rim. The delay and inconvenience incident to a punctured tire are consequently avoided as by my invention a rim with inflated tire thereon may easily and quickly be substituted for a rim, the tire around which is punctured.

It is also evident that by means of my invention a tire may be readily disconnected from the rim by removing one of the two parts of which the rim is composed.

While I have described more or less precisely the details of construction, I do not wish to be understood as limiting myself thereto, as I contemplate changes in form, the proportion of parts, and the substitution of equivalents, as circumstances may suggest or render expedient, without departing from the spirit of my invention.

Having now fully described my invention what I claim as new and desire to secure by Letters Patent is:

1. In a vehicle wheel, the combination with the spokes thereof, of a two-part spoke head secured to the end of each spoke, flanges on the upper ends of the two parts of each spoke head forming a dove-tail channel between the same, a tire rim removably surrounding the spoke heads, dove-tail lugs on the inner surface of the tire rim engaging the dove tail channels in the spoke heads, and means for forcing the flanges on each spoke head toward each other and against the interposed lug.

2. In a vehicle wheel, the combination with the spokes thereof, of spoke heads secured to the ends of the spokes and having transverse dove tail channels therein, a two-part tire rim removably surrounding the spoke heads, plates to which one part of said rim is rigidly and the other part detachably secured, and transverse dove tail lugs on said plates adapted to removably engage the dove tail channels in the spoke heads.

3. In a vehicle wheel, the combination with the spokes thereof, of a two-part spoke head secured at the end of each spoke, flanges forming a dove tail channel on the end of each spoke head, a two-part tire rim surrounding the spoke heads, plates alining with the spoke heads to which one part of said rim is rigidly and the other part detachably secured, dove-tail lugs on said plates engaging the dove-tail channels in the spoke heads, and a bolt extending through the two parts of each spoke head to clamp the flanges thereon against the interposed lug.

4. As an article of manufacture, a wheel rim divided longitudinally into two parts and having a series of independent separated plates distributed about the inner surface thereof and each rigidly secured by independent fastening means to each of the rim parts.

5. In a wheel, a rim divided longitudinally, a series of plates distributed about the interior surface thereof, means for fastening each of said plates permanently to one of the rim parts, and means for rigidly and detachably fastening each of the plates to the other rim part.

In testimony whereof, I sign this specification in the presence of two witnesses.

THOMAS B. JEFFERY.

Witnesses:
GEO. H. EDDY,
GEO. L. WILKINSON.